United States Patent
Itabashi

(10) Patent No.: US 11,285,952 B2
(45) Date of Patent: Mar. 29, 2022

(54) BRAKING AND DRIVING FORCE CONTROL DEVICE

(71) Applicant: TOYOTA JIDOSHA KABUSHIKI KAISHA, Toyota (JP)

(72) Inventor: Kaiji Itabashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 16/452,694

(22) Filed: Jun. 26, 2019

(65) Prior Publication Data

US 2020/0094835 A1    Mar. 26, 2020

(30) Foreign Application Priority Data

Sep. 21, 2018   (JP) .............................. JP2018-177654

(51) Int. Cl.
    *B60W 30/18*    (2012.01)
    *B60W 10/06*    (2006.01)
    *B60W 10/184*   (2012.01)

(52) U.S. Cl.
    CPC ...... *B60W 30/18136* (2013.01); *B60W 10/06* (2013.01); *B60W 10/184* (2013.01); *B60W 2520/10* (2013.01); *B60W 2520/105* (2013.01); *B60W 2710/06* (2013.01); *B60W 2710/18* (2013.01)

(58) Field of Classification Search
    CPC ........... B60W 30/18136; B60W 10/06; B60W 10/184; B60W 2710/18; B60W 2520/10; B60W 2710/06; B60W 2520/105; B60W 10/18; B60W 2050/0056
    See application file for complete search history.

(56) References Cited

FOREIGN PATENT DOCUMENTS

| JP | 2008/024027 A | * | 2/2008 | ............. Y02T 10/40 |
|----|---------------|---|--------|---------|
| JP | 2008-024027 A |   | 2/2008 | |
| JP | 2010-209695 A |   | 9/2010 | |

* cited by examiner

*Primary Examiner* — Brian P Sweeney
(74) *Attorney, Agent, or Firm* — Oliff PLC

(57) ABSTRACT

A braking and driving force control device includes a target braking and driving force calculation unit, and a braking and driving force distribution unit. The braking and driving force distribution unit causes a driving device to generate a target braking and driving force in a case where the target braking and driving force is within the availability, and in a case where the target braking and driving force is less than a lower limit value of the availability, causes the driving device to generate a braking and driving force corresponding to the lower limit value of the availability, performs arithmetic processing of suppressing time variation on the lower limit value of the availability, and causes a braking device to generate a braking force corresponding to a difference between the lower limit value of the availability after the arithmetic processing and the target braking and driving force.

5 Claims, 5 Drawing Sheets

BRAKING AND DRIVING FORCE CONTROL DEVICE

INCORPORATION BY REFERENCE

The disclosure of Japanese Patent Application No. 2018-177654 filed on Sep. 21, 2018 including the specification, drawings and abstract is incorporated herein by reference in its entirety.

BACKGROUND

1. Technical Field

The disclosure relates to a braking and driving force control device that is mounted on a vehicle to control a braking and driving force of the vehicle.

2. Description of Related Art

A control device that is mounted on a vehicle, acquires a request for a braking and driving force (a braking force and a driving force) that has to be generated on the vehicle, from a driving assistance device or the like, and integratedly controls a driving device, such as a powertrain, that can generate both a braking force and a driving force, and a braking device, such as a brake, that can generate a braking force, based on the acquired request, has been proposed.

Japanese Unexamined Patent Application Publication No. 2008-024027 (JP 2008-024027 A) discloses a control device that causes a driving device to generate a braking and driving force and causes a braking device to generate a braking force, based on a requested braking and driving force and availability that represents the range of the braking and driving force that the driving device can currently generate. In JP 2008-024027 A, contradictory operations are avoided by integratedly controlling the driving device and the braking device, and low fuel consumption, electric power saving, and part consumption suppression are achieved by generating a braking and driving force by the driving device as much as possible to reduce the use frequency of the braking device.

In general, the braking and driving force is expressed by a force that makes a traveling direction of the vehicle a positive direction, and for example, in a case where a value is positive, it represents a driving force, and in a case where a value is negative, it means a braking force. The availability of the driving device is represented, for example, by the range of the braking and driving force. In the control device of JP 2008-024027 A, in a case where the requested braking and driving force is within the availability, the requested braking and driving force is generated by the driving device. In a case where the requested braking and driving force is less than a lower limit value of the availability, the driving device generates a braking and driving force that is the lower limit value of the availability, and the braking device generates a braking force corresponding to the difference between the lower limit value of the availability and the requested braking and driving force.

SUMMARY

For example, in the case of engine traveling, the lower limit value of the availability of the driving device is determined by adding an amount corresponding to an amplification or an amount corresponding to a loss by a transmission or a torque converter to an engine torque when a throttle is fully closed. In this manner, the lower limit value of the availability of the driving device generally includes a non-linear element, and changes discontinuously while the vehicle is traveling. For this reason, in the control device of JP 2008-024027 A described above, when the lower limit value of the availability at each point in time is used for control, variation in the braking force that is generated by the braking device is severe according to discontinuous variation in the lower limit value, and thus there is a possibility that an influence of the deterioration of the feeling that an occupant receives may occur in the behavior of the vehicle.

For this reason, JP 2008-024027 A discloses achieving the stabilization of control by retaining and using the lower limit value of the availability at the point in time when the braking device operates, as the lower limit value of the availability, in the calculation of the braking force that is generated by the braking device. However, for example, in the case of engine traveling, when a speed of the vehicle becomes smaller than a speed in a range of 8 km/h to 10 km/h, a driving force corresponding to creep torque becomes dominant over a braking force corresponding to the engine brake in the driving device, and thus a state where the driving force is generated is created. In the calculation of the braking force that is generated by the braking device, when a constant value is retained and used as the lower limit value of the availability, it is not possible to cope with the variation in the actual availability of such a driving device, and the braking and driving force that is actually generated greatly deviates from the requested braking and driving force. Therefore, in a case where the speed of the vehicle is equal to or lower than a predetermined value, it is conceivable to correct a requested value of the braking and driving force according to the speed of the vehicle. FIG. 6 shows an example of a variation pattern of the lower limit value of the availability of the driving device according to the speed of the vehicle, and an example of a map of correction values that has to be subtracted from the requested value of the braking and driving force according to the speed of the vehicle. However, this method uniformly applies the correction value, based on a predetermined model, and does not reflect the variation in the lower limit value of the actual availability. In a case where the speed of the vehicle has already become equal to or lower than a predetermined value at the point in time when the braking device has operated, there is a possibility that overcorrection may occur.

The disclosure provides a braking and driving force control device capable of coping with a characteristic change of a driving device and realizing accurate control, while stabilization of control is attained.

A first aspect of the disclosure relates to a braking and driving force control device mounted on a vehicle and configured to control a driving device configured to generate a braking and driving force and a braking device configured to generate a braking force. The braking and driving force control device includes: a target braking and driving force calculation unit configured to calculate a target braking and driving force that is a target value of the braking and driving force, based on at least a requested value of acceleration; and a braking and driving force distribution unit configured to cause the driving device to generate the braking and driving force and cause the braking device to generate the braking force, based on the target braking and driving force and availability that represents a range of the braking and driving force currently generable by the driving device. The braking and driving force distribution unit is configured to, in a case where the target braking and driving force is within the availability, cause the driving device to generate the target braking and driving force, and in a case where the target braking and driving force is less than a lower limit value of the availability, cause the driving device to generate a braking and driving force corresponding to the lower limit value of the availability, perform arithmetic processing of suppressing time variation on the lower limit value of the availability, and cause the braking device to generate a braking force corresponding to a difference between the lower limit value of the availability after the arithmetic processing and the target braking and driving force.

In the braking and driving force control device according to the first aspect, the arithmetic processing may include a low-pass filter arithmetic operation.

In the braking and driving force control device according to the first aspect, the arithmetic processing may include change amount guard processing of causing a calculated value to follow the lower limit value of the availability while variation is suppressed such that a difference between the calculated value and a previous calculated value is within a predetermined allowable value.

In the braking and driving force control device according to the first aspect, the braking and driving force distribution unit may be configured to change a degree of suppressing the time variation according to a variation characteristic of the lower limit value of the availability with respect to a speed of the vehicle in the arithmetic processing.

In the braking and driving force control device according to the first aspect, the braking and driving force distribution unit may be configured to, in a case where the speed of the vehicle is less than a predetermined speed, relax the degree of suppressing the time variation, compared to a case where the speed of the vehicle is equal to or higher than the predetermined speed, in the arithmetic processing.

A second aspect of the disclosure relates to a braking and driving force control device mounted on a vehicle and configured to control a driving device configured to generate a braking and driving force and a braking device configured to generate a braking force. The braking and driving force control device includes: a target braking and driving force calculation unit configured to calculate a target braking and driving force that is a target value of the braking and driving force by performing processing using feedback of acceleration of the vehicle, based on at least a requested value of acceleration, acceleration of the vehicle, and a speed of the vehicle; and a braking and driving force distribution unit configured to cause the driving device to generate the braking and driving force and cause the braking device to generate the braking force, based on the target braking and driving force and availability that represents a range of the braking and driving force currently generable by the driving device. The target braking and driving force calculation unit is configured to set a gain of the feedback according to a variation characteristic of the lower limit value of the availability with respect to the speed of the vehicle. The braking and driving force distribution unit is configured to, in a case where the target braking and driving force is within the availability, cause the driving device to generate the target braking and driving force, and in a case where the target braking and driving force is less than the lower limit value of the availability, cause the driving device to generate a braking and driving force corresponding to the lower limit value of the availability, and cause the braking device to generate a braking force corresponding to a difference between the target braking and driving force and the lower limit value of the availability at a point in time when the target braking and driving force has become less than the lower limit value of the availability.

In the braking and driving force control device according to the second aspect, the target braking and driving force calculation unit may be configured to, in a case where the speed of the vehicle is equal to or lower than a predetermined speed, set the gain of the feedback to be large, compared to a case where the speed of the vehicle is higher than the predetermined speed.

In the braking and driving force control device according to the second aspect, the target braking and driving force calculation unit may be configured to, in a case where the speed of the vehicle is equal to or lower than a predetermined speed and the braking device generates the braking force, set the gain of the feedback to be large, compared to a case where the speed of the vehicle is higher than the predetermined speed.

According to the aspects of the disclosure, it is possible to provide a braking and driving force control device capable of coping with a characteristic change of a driving device and realizing accurate control, while stabilization of control is attained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

A braking and driving force control device according to a first embodiment of the disclosure causes a driving device to generate a desired braking and driving force within availability. In a case where the driving device alone cannot generate a desired braking and driving force (a case where a braking and driving force less than a lower limit value of the availability is requested), the braking and driving force control device causes a braking device to generate a braking force. A value in which time variation is suppressed, of the lower limit value of the availability, is used for the calculation of the braking force that is generated. For this reason, it is possible to perform braking force control accurately corresponding to a gradual change in the lower limit value of the availability while a bad influence on the behavior of the vehicle is suppressed by suppressing steep variation of a calculation result and suppressing variation in an operation of the braking device. Hereinafter, the first embodiment will be described in detail with reference to the drawings.

Configuration

Figure 1:
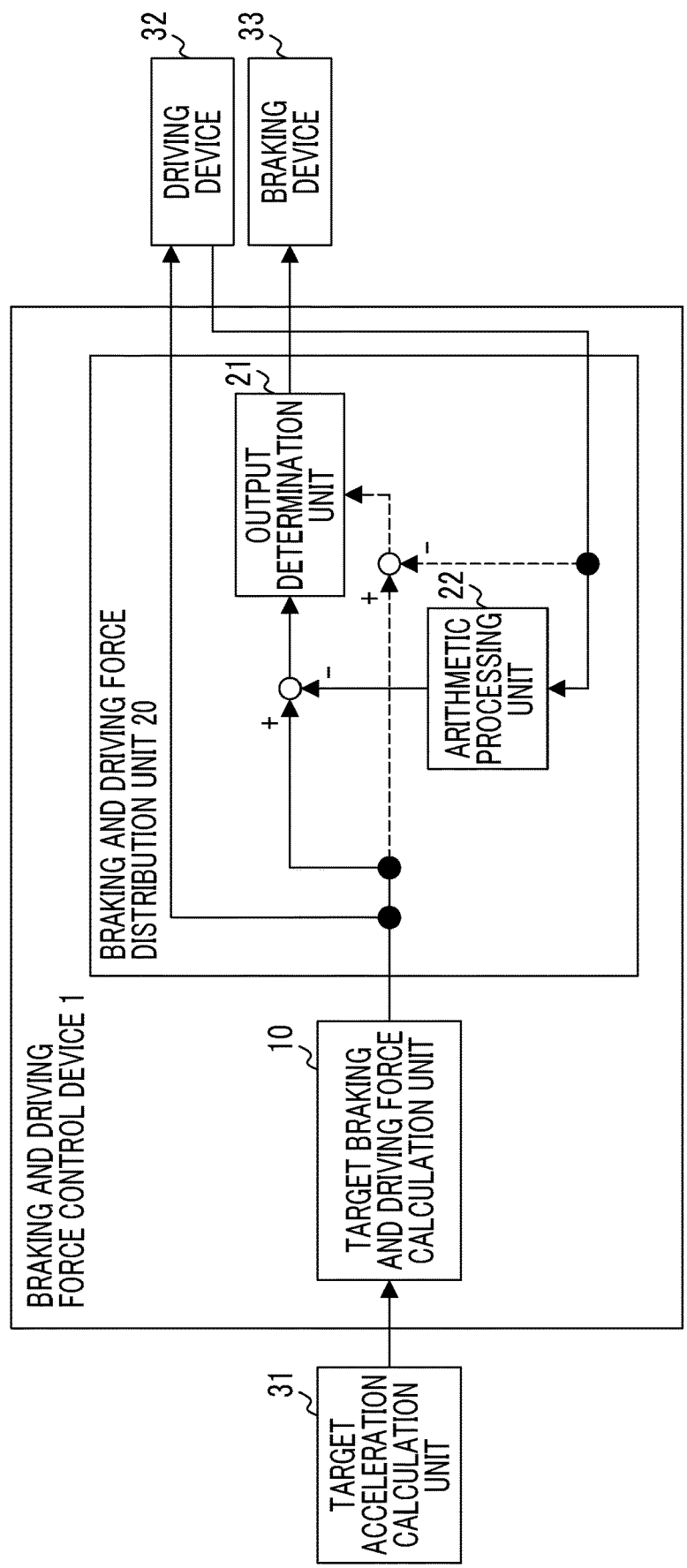
FIG. 1 is a diagram showing functional blocks of a braking and driving force control device according to a first embodiment of the disclosure.

FIG. 1 shows a functional block diagram of a braking and driving force control device 1 according to the first embodiment and peripheral equipment thereof. The braking and driving force control device 1 acquires target acceleration that is calculated in a target acceleration calculation unit 31 and is a requested value of acceleration that has to be generated on the vehicle. The braking and driving force control device 1 acquires from a driving device 32 the availability that represents the range of a braking and driving force that the driving device 32 can currently generate. The braking and driving force control device 1 controls the driving device 32 and a braking device 33.

The target acceleration calculation unit 31 is included in, for example, a driving assistance device that performs driving assistance of the vehicle. The driving assistance device acquires information representing the state such as a speed, acceleration, and a yaw rate of the vehicle, or the state of a target or the like around the vehicle, from sensors or the like provided in the vehicle, and calculates and outputs requested values for vehicle control of acceleration, a steering angle, and the like for realizing driving assistance functions such as speed maintenance, collision avoidance, and lane maintenance, for example. The target acceleration calculation unit 31 calculates and outputs the acceleration among the requested values. The vehicle may be provided with a plurality of driving assistance devices according to the functions.

The braking and driving force control device 1 is provided with a target braking and driving force calculation unit 10 and a braking and driving force distribution unit 20. The target braking and driving force calculation unit 10 calculates a target braking and driving force that is a braking and driving force that has to be generated on the vehicle, based on the target acceleration. In the first embodiment, the target acceleration is acceleration that makes a traveling direction of the vehicle a positive direction. In the first embodiment, the target braking and driving force is a force that makes the traveling direction of the vehicle a positive direction, and represents a driving force when the value is positive, and represents a braking force when the value is negative. In a case where a plurality of driving assistance devices is provided, the target acceleration is acquired from the target acceleration calculation unit 31 of each of the driving assistance devices, and one of the target accelerations may be selected based on a predetermined selection rule using, for example, priority of the driving assistance device, a determination of a magnitude of each target acceleration, or the like. The target braking and driving force calculation unit 10 may appropriately acquire information from the outside when information representing a motion state or the like of the vehicle, such as the speed, acceleration, or yaw rate of the vehicle, is requested for a determination of such a selection.

The braking and driving force distribution unit 20 includes an arithmetic processing unit 22 and an output determination unit 21, which will be described later, as an example, and controls the distribution of the braking and driving force that is generated by the driving device 32 and the braking force that is generated by the braking device 33, based on the target braking and driving force and the availability.

The driving device 32 is a device of a powertrain system that includes, for example, an engine and a transmission, or equipment such as a motor, and can generate a driving force by the engine or the motor and generate a braking force by a torque loss by the transmission or a regenerative power generation load by the motor. In the driving device 32, a built-in availability calculation unit (not shown) calculates and outputs the availability described above, based on the operation state of the equipment. The braking device 33 includes, for example, a brake, an alternator, or the like and can generate a braking force.

The requested value of the steering angle that is output from the driving assistance device is notified to a power steering device (not shown), and steering control based on the requested value is performed.

Processing

Figure 2:
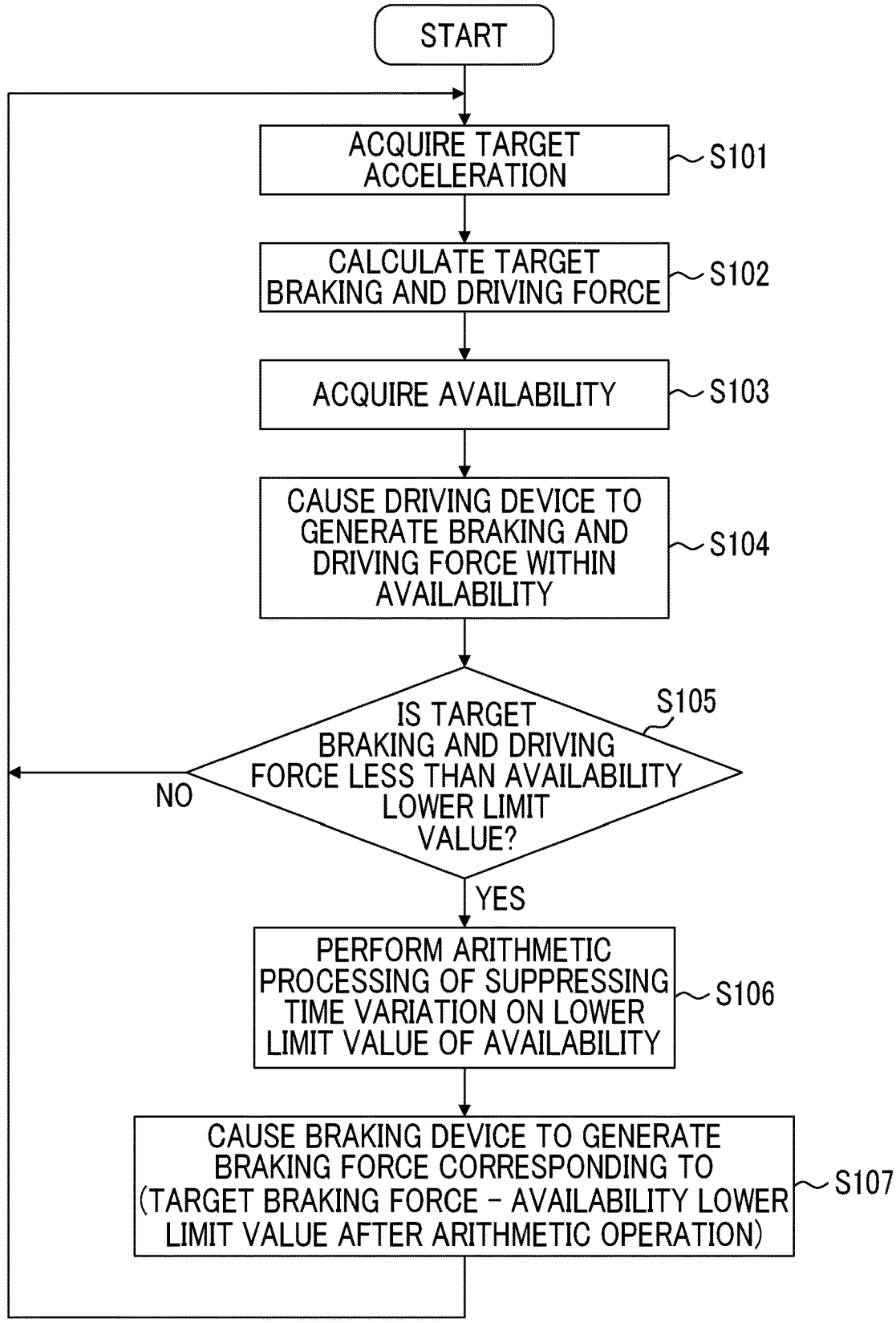
FIG. 2 is a flowchart showing processing according to the first embodiment of the disclosure.

FIG. 2 is a flowchart showing an example of processing that is performed by the braking and driving force control device 1. An example of the processing will be described with reference to FIG. 2. The flow shown in FIG. 2 is started when a driving assistance function device starts processing and the target acceleration calculation unit 31 calculates and outputs the target acceleration, and the processing of each step is repeatedly executed.

(Step S101): The target braking and driving force calculation unit 10 acquires the target acceleration from the target acceleration calculation unit 31.

(Step S102): The target braking and driving force calculation unit 10 calculates the target braking and driving force, based on the target acceleration acquired in step S101. Basically, the calculation of the target braking and driving force can be performed by obtaining a force for realizing the target acceleration by using the weight of the vehicle. As described above, for example, in a case where a plurality of driving assistance devices is provided and the target acceleration is acquired from the target acceleration calculation unit 31 of each of the driving assistance devices, the target braking and driving force calculation unit 10 may select any one of the target accelerations, based on a predetermined selection rule, and may appropriately use information representing the vehicle state such as the speed, acceleration, and yaw rate of the vehicle in the selection.

(Step S103): The braking and driving force distribution unit 20 acquires the availability from the driving device 32.

(Step S104): The braking and driving force distribution unit 20 notifies the driving device 32 of the target braking and driving force that the target braking and driving force calculation unit 10 has calculated in step S102. The driving device 32 generates the braking and driving force within the availability. That is, in a case where the target braking and driving force is equal to or higher than the lower limit value and equal to or lower than the upper limit value of the availability, the driving device 32 generates the target braking and driving force. In a case where the target braking and driving force is less than the lower limit value of the availability, the driving device 32 generates a braking and driving force corresponding to the lower limit value of the availability. In a case where the target braking and driving force is larger than the upper limit value of the availability, the driving device 32 generates a braking and driving force corresponding to the upper limit value of the availability. In this manner, in the first embodiment, the braking and driving force distribution unit 20 directly notifies the driving device 32 of the target braking and driving force calculated in the target braking and driving force calculation unit 10, and consequently causes the driving device 32 to generate the braking and driving force within the availability. As an example, the target acceleration or the target braking and driving force is calculated by the target acceleration calculation unit 31 or the target braking and driving force calculation unit 10 by acquiring availability and taking into account the availability, such that the target braking and driving force does not exceed the upper limit value of the availability. Alternatively, in a case where the target braking and driving force is calculated as a value larger than the upper limit value of the availability, the driving device 32 may generate a driving force corresponding to the upper limit value of the availability, assuming that the maximum capability (the upper limit value of the availability) of the driving device 32 is requested as the target braking and driving force.

(Step S105): The output determination unit 21 of the braking and driving force distribution unit 20 acquires the difference between the target braking and driving force that the target braking and driving force calculation unit 10 has calculated in step S102 and the lower limit value of the availability acquired in step S103 (a dotted line arrow that is connected to the output determination unit 21 in FIG. 1), and compares magnitude between the target braking and driving force and the lower limit value of the availability.

In a case where the target braking and driving force is less than the lower limit value of the availability, the routine proceeds to step S106. In a case where the target braking and driving force is equal to or higher than the lower limit value of the availability, the routine proceeds to step S101.

(Step S106): The arithmetic processing unit 22 of the braking and driving force distribution unit 20 performs arithmetic processing of suppressing time variation on the lower limit value of the availability acquired in step S103. The arithmetic processing unit 22 performs, for example, a low-pass filter arithmetic operation. That is, the arithmetic processing unit 22 attenuates the component of a frequency higher than a predetermined frequency among the time variations more than the component of a frequency lower than the predetermined frequency, with respect to the lower limit value of the availability that is input each time the availability is acquired, and outputs the attenuated frequency. For example, when an appropriately set filter coefficient is set to be K, an input value at time k (=1, 2, 3, . . .) is set to be x(k), and an output value is set to be y(k), y(k) can be calculated by the following expressions.

$$y(1)=x(1)$$

$$y(k)=K \times y(k-1)+(1-K) \times x(k) \text{ (when } k \text{ is equal to or larger than 2)}$$

Alternatively, the arithmetic processing unit 22 may perform change amount guard processing of causing a calculated value to follow the lower limit value of the input availability while the variation of the calculated value is suppressed by making the difference between a calculated value that is currently output and a previously output calculated value be within a predetermined allowable value. That is, the arithmetic processing unit 22 outputs the lower limit value of the input availability in a case where the absolute value of the difference between the previous output value of the arithmetic processing unit 22 and the lower limit value of the input availability is equal to or less than a predetermined positive allowable value. The arithmetic processing unit 22 outputs a value closer to the lower limit value of the input availability, among values in which the absolute value of the difference between the previous output value of the arithmetic processing unit 22 and the lower limit value of the input availability reaches an allowable value in a case where the absolute value of the difference between the previous output value of the arithmetic processing unit 22 and the lower limit value of the input availability is larger than the allowable value.

In the output from the arithmetic processing unit 22 as described above, a component that changes in a relatively short time, which is included in the time variation of the lower limit value of the availability that is input, is removed. However, a component that changes over a relatively long time remains in the output. The content of the arithmetic processing of the arithmetic processing unit 22 is not limited to the above, as long as the same effect is obtained, and various arithmetic operations can be adopted appropriately. The low-pass filter and the change amount guard processing described above may be combined.

In a case where the arithmetic processing unit 22 is a low-pass filter, the speed of the vehicle may be acquired and the filter coefficient may be changed based on the acquired speed of the vehicle. The filter coefficient K can be calculated by an expression, $K=\exp(-c/T)$ (c is a constant) using a time constant T. The filter coefficient may be changed by changing the time constant T according to the speed of the vehicle. For example, in a case where the speed of the vehicle is 10 km/h or more, the time constant T is set to be a predetermined fixed value, and in a case where the speed of the vehicle is less than 10 km/h, the time constant T is gradually reduced as the speed of the vehicle decreases. In this way, when the speed of the vehicle is a low speed less than 10 km/h, compared to a case where the speed of the vehicle is 10 km/h or more, the filter coefficient K becomes smaller as the speed of the vehicle decreases, and thus the variation of the lower limit value of the availability is easily reflected in an output value. In this way, in a case where an increase in the lower limit value of the availability due to creep torque occurs at the time of a low speed of the vehicle, it can be early reflected in the output of the arithmetic processing unit 22.

In a case where the arithmetic processing unit 22 performs the change amount guard processing, the speed of the vehicle may be acquired and the allowable value described above may be changed based on the acquired speed of the vehicle. For example, in a case where the speed of the vehicle is 10 km/h or more, the allowable value is set to be a predetermined fixed value, and in a case where the speed of the vehicle is less than 10 km/h, the allowable value is gradually increased as the speed of the vehicle decreases. In this way, when the speed of the vehicle is a low speed less than 10 km/h, compared to a case where the speed of the vehicle is 10 km/h or more, an allowable variation amount of the lower limit value of the availability increases and the variation is easily reflected in an output value. In this way, in a case where an increase in the lower limit value of the availability due to creep torque occurs at the time of a low speed of the vehicle, it can be early reflected in the output of the arithmetic processing unit 22. A threshold value is not limited to 10 km/h regardless of the processing content of the arithmetic processing unit 22, and may be set according to a variation characteristic of the lower limit value of the actual availability. As the variation characteristic of the lower limit value of the availability, an increase in the lower limit value due to the creep torque at the time of a low speed is assumed. However, there is no limitation thereto, and in a case where there is a variation characteristic with respect to the speed of the vehicle that is assumed else, according to this, the arithmetic processing unit 22 may change the degree of suppressing the time variation of the lower limit value of the availability, based on the speed of the vehicle.

(Step S107): The output determination unit 21 of the braking and driving force distribution unit 20 acquires the difference between the target braking and driving force that the target braking and driving force calculation unit 10 has calculated in step S102 and the lower limit value of the availability after the arithmetic processing of suppressing the time variation, which the arithmetic processing unit 22 has output in step S106 (a solid line arrow that is connected to the output determination unit 21 in FIG. 1). The output determination unit 21 causes the braking device 33 to generate a braking force corresponding to the difference between the target braking and driving force and the lower limit value of the availability after the arithmetic operation. Thereafter, the routine proceeds to step S101 and the processing is repeated. The above flow is discontinued, for example, when an ignition switch (power switch) is turned off and the function of the driving assistance device is stopped.

Effects

In the braking and driving force control device 1 of the first embodiment, when the target braking and driving force is within the availability of the driving device 32, the braking and driving force control device 1 causes the driving device 32 to generate the target braking and driving force. When the target braking and driving force is less than the lower limit value of the availability of the driving device 32, the braking and driving force control device 1 causes the braking device 33, in addition to the driving device 32, to generate a braking force. The braking force that is generated by the braking device 33 is a braking force corresponding to the difference between the target braking force and the lower limit value of the availability after the processing of suppressing the time variation is performed. For this reason, the bad influence on the behavior of the vehicle, which is generated in a case where the control corresponding to the variation in a short time of the braking force is performed, is suppressed while the braking force that is generated by the braking device 33 is based on the availability of the actual driving device 32, and thus it is possible to avoid the deterioration of the feeling that the occupant receives. It is possible to perform control of the braking force, which accurately reflects temporally gradual variation or a steady change of the lower limit value of the availability. In a determination of whether or not to cause the braking device 33 to generate a braking force, the lower limit value of the availability is used without performing the processing of suppressing the time variation, and therefore, a determination itself that the braking device 33 has to be operated can be made without delay, and a start delay of the operation of the braking device 33 or an unnecessary continuation of the operation can be avoided.

In a case where the speed of the vehicle is a low speed less than a predetermined value, compared to a case where the speed of the vehicle is equal to or higher than the predetermined value, when the degree of suppressing the time variation in the processing that is performed by the arithmetic processing unit 22 is relaxed, the variation in the lower limit value of the availability at the time of a low speed can be early reflected in the control of the braking force of the braking device 33. In this manner, by relaxing the degree of suppressing the time variation under a predetermined condition, based on the variation characteristic of the lower limit value of the availability, the control of the braking force, which suitably reflects a characteristic, becomes possible.

Second Embodiment

A braking and driving force control device according to a second embodiment of the disclosure causes the driving device to generate a desired braking and driving force within the availability. In a case where a desired braking and driving force cannot be generated solely by the driving device (a case where a braking and driving force less than the lower limit value of the availability is requested), the braking and driving force control device causes the braking device to generate a braking force. This point is the same as that in the first embodiment. In the calculation of the braking force that is generated, the lower limit value of the availability at the time of shortage occurrence is fixedly used as a retention value, and therefore, steep variation in a calculation result is suppressed, variation in the operation of the braking device is suppressed, and the bad influence on the behavior of the vehicle is suppressed. In the calculation of the target braking and driving force, the actual acceleration of the vehicle is fed back with a gain according to the variation characteristic of the lower limit value of the availability, and therefore, the braking force control accurately corresponding to a change in the lower limit value of the actual availability can be performed. The gain is changed based on the speed of the vehicle, and therefore, suitable feedback control can be performed according to the variation characteristic of the lower limit value of the availability by the speed of the vehicle. Hereinafter, the second embodiment will be described in detail with reference to the drawings.

Configuration

Figure 3:
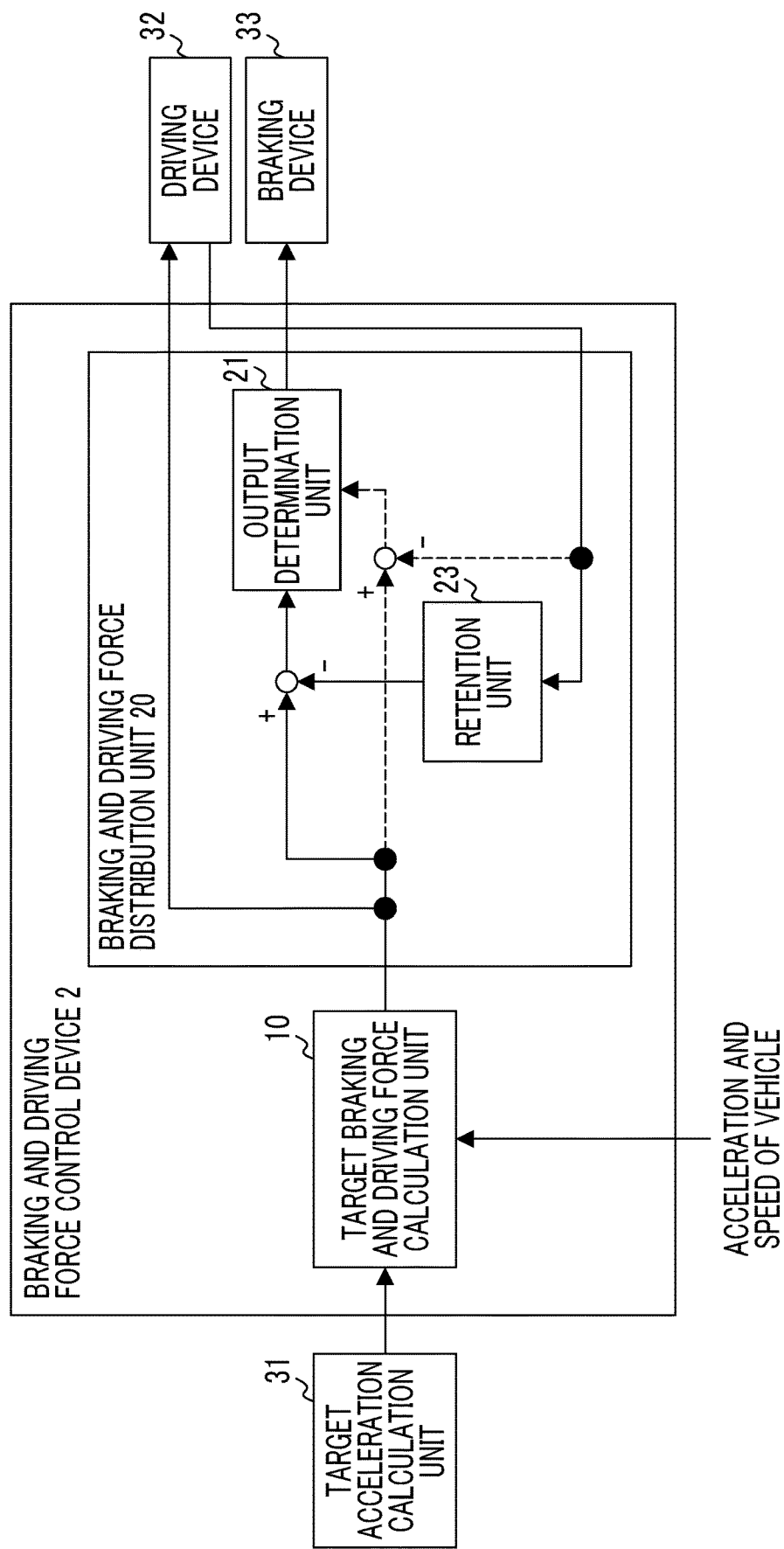
FIG. 3 is a diagram showing functional blocks of a braking and driving force control device according to a second embodiment of the disclosure.

FIG. 3 shows a functional block diagram of a braking and driving force control device 2 according to the second embodiment and peripheral equipment thereof. The configuration of the braking and driving force control device 2 is different from that of the braking and driving force control device 1 according to the first embodiment in that the braking and driving force control device 2 is provided with a retention unit 23 instead of the arithmetic processing unit 22 and the target braking and driving force calculation unit 10 acquires the acceleration and speed of the vehicle from the sensors mounted on the vehicle.

Processing

Figure 4:
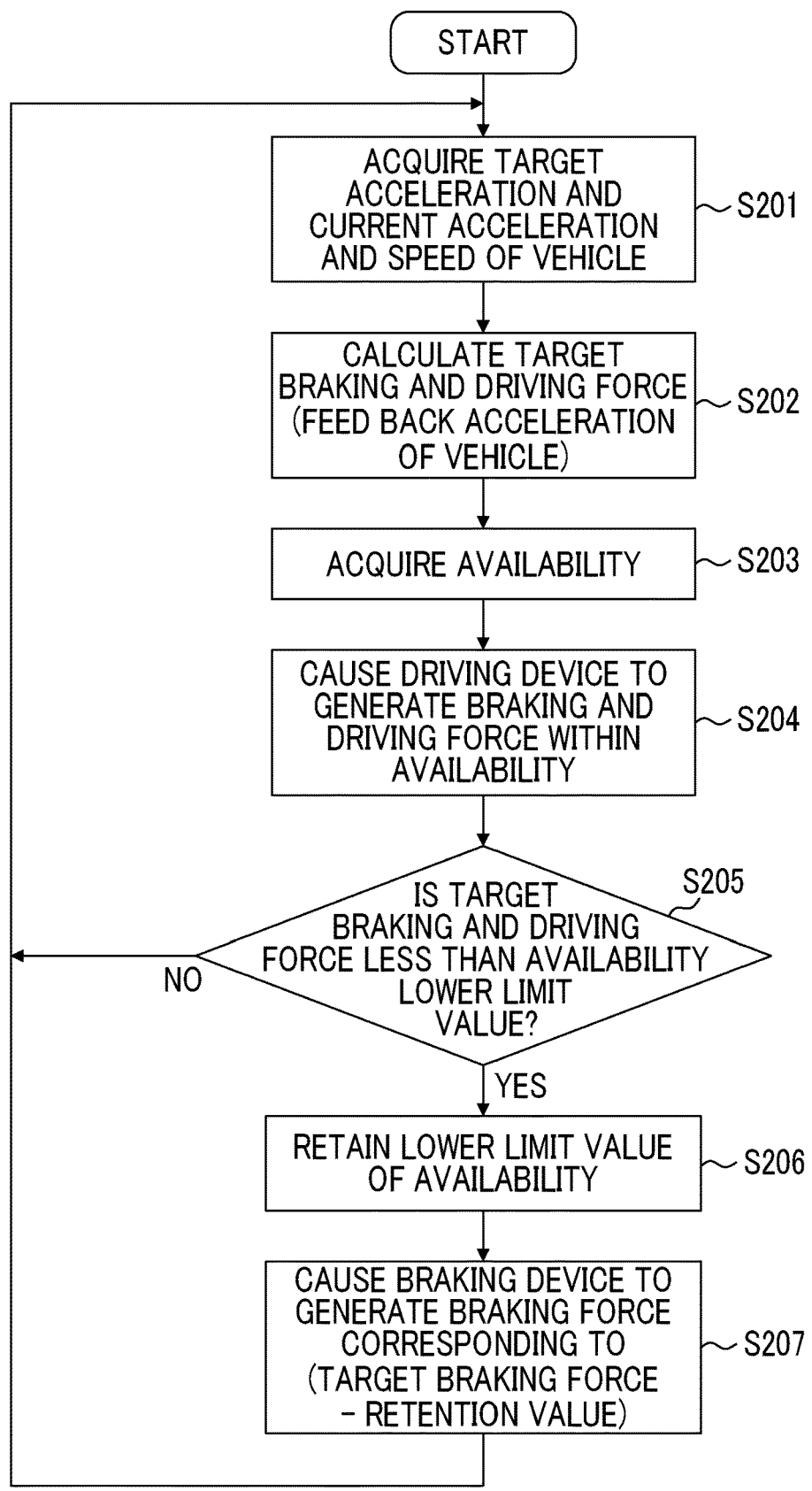
FIG. 4 is a flowchart showing processing according to the second embodiment of the disclosure.

FIG. 4 is a flowchart showing an example of processing that is performed by the braking and driving force control device 2. An example of the processing will be described with reference to FIG. 4. The flow shown in FIG. 4 is started when the driving assistance function device starts processing and the target acceleration calculation unit 31 calculates and outputs the target acceleration, and the processing of each step is repeatedly executed.

(Step S201): The target braking and driving force calculation unit 10 acquires the target acceleration from the target acceleration calculation unit 31. The target braking and driving force calculation unit 10 acquires the current acceleration and speed of the vehicle from the sensors mounted on the vehicle. The acceleration and speed of the vehicle may be calculated values calculated based on the sensor values by other devices. Alternatively, the target braking and driving force calculation unit 10 may acquire the speed of the vehicle and calculate the acceleration, based on a time change in the acquired speed of the vehicle.

(Step S202): The target braking and driving force calculation unit 10 calculates the target braking and driving force, based on the target acceleration and the acceleration of the vehicle acquired in step S201. This processing is basically the same as step S102 in the first embodiment. However, in the second embodiment, control using not only the target acceleration but also the fed-back acceleration of the vehicle is performed to calculate the target braking and driving force.

Figure 5:
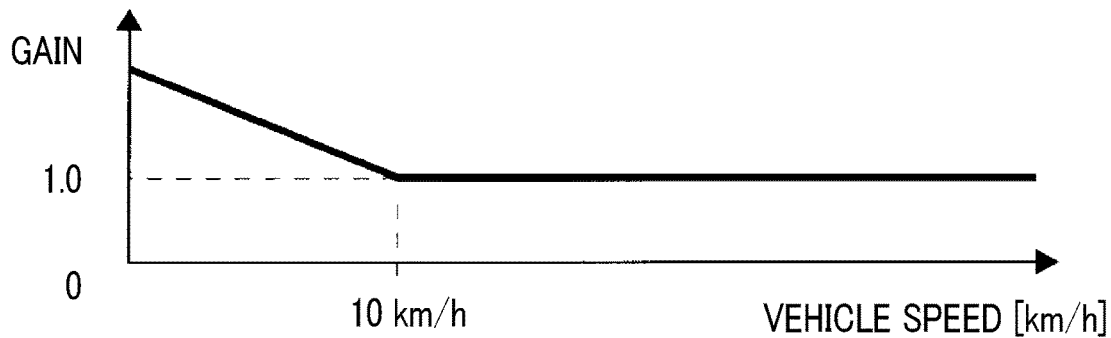
FIG. 5 is a diagram showing an example of a gain in feedback control according to the second embodiment of the disclosure.
Figure 6:
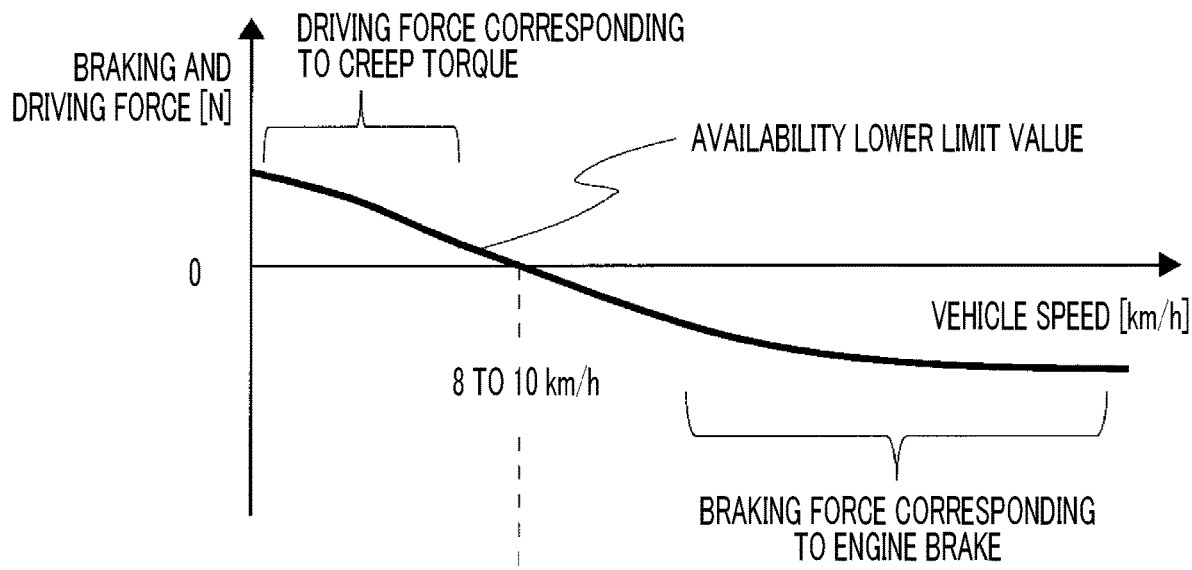
FIG. 6 is a diagram showing an example of a variation pattern of a lower limit value of availability of a driving device according to a speed of a vehicle, and an example of a map of correction values for a requested braking and driving force.
Figure 6:
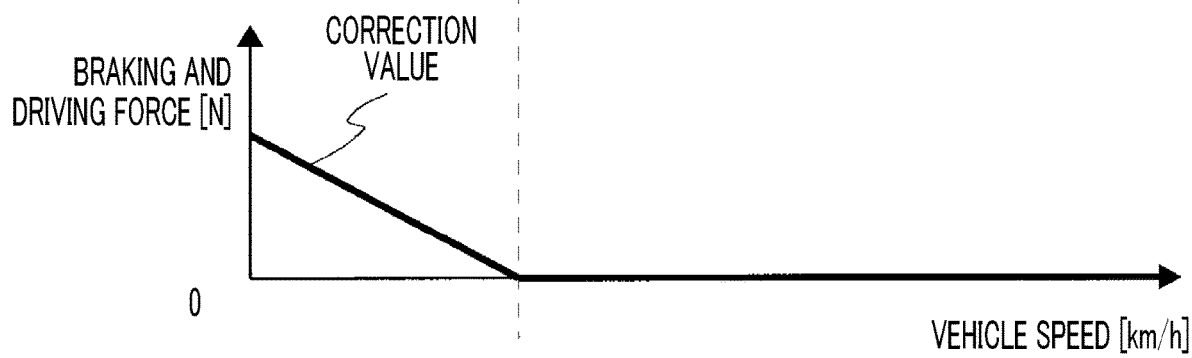

The target braking and driving force calculation unit 10 changes the gain of feedback control, based on the speed of the vehicle. For example, in a case where the speed of the vehicle is 10 km/h or more, the gain is set to be a predetermined fixed value, and in a case where the speed of the vehicle is less than 10 km/h, the gain is gradually increased as the speed of the vehicle decreases. FIG. 5 shows an example of a map of the gain according to the speed of the vehicle. In this way, when the speed of the vehicle is a low speed less than 10 km/h, compared to a case where the speed of the vehicle is 10 km/h or more, the effect of the feedback increases as the speed of the vehicle decreases. For this reason, in a case where the target braking and driving force is different from a braking and driving force that is actually generated, a correction amount of the target braking and driving force becomes large. In this way, even in a case where an increase in the lower limit value of the availability due to creep torque occurs at the time of a low speed of the vehicle, it is possible to correct the target braking and driving force so as to early reflect the influence of the increase in the lower limit value. A threshold value is not limited to 10 km/h and may be set according to the variation characteristic of the lower limit value of the actual availability. As the variation characteristic of the lower limit value of the availability, an increase in the lower limit value due to the creep torque at the time of a low speed is assumed. However, there is no limitation thereto, and in a case where there is a variation characteristic with respect to the speed of the vehicle that is assumed else, according to this, the target braking and driving force calculation unit 10 may perform the processing of setting the gain, based on the speed of the vehicle.

(Step S203): The braking and driving force distribution unit 20 acquires the availability from the driving device 32.

(Step S204): The braking and driving force distribution unit 20 notifies the driving device 32 of the target braking and driving force that the target braking and driving force calculation unit 10 has calculated in step S202. Similar to the first embodiment, the driving device 32 generates a braking and driving force within the availability.

(Step S205): The output determination unit 21 of the braking and driving force distribution unit 20 acquires the difference between the target braking and driving force that the target braking and driving force calculation unit 10 has calculated in step S202 and the lower limit value of the availability acquired in step S203 (a dotted line arrow that is connected to the output determination unit 21 in FIG. 3), and compares the magnitude between the target braking and driving force and the lower limit value of the availability. In a case where the target braking and driving force is less than the lower limit value of the availability, the routine proceeds to step S206. In a case where the target braking and driving force is equal to or higher than the lower limit value of the availability, the routine proceeds to step S201.

(Step S206): The retention unit 23 of the braking and driving force distribution unit 20 retains the lower limit value of the availability acquired in step S203, and outputs the retained lower limit value.

(Step S207): The output determination unit 21 of the braking and driving force distribution unit 20 acquires the difference between the target braking and driving force that the target braking and driving force calculation unit 10 has calculated in step S202 and the retention value of the lower limit value of the availability that the retention unit 23 has output in step S206 (a solid line arrow that is connected to the output determination unit 21 in FIG. 3). The output determination unit 21 causes the braking device 33 to generate a braking force corresponding to the difference between the target braking and driving force and the retention value of the lower limit value of the availability. Thereafter, the routine proceeds to step S201 and the processing is repeated. The above flow is discontinued, for example, when an ignition switch (power switch) is turned off and the function of the driving assistance device is stopped.

In Step S202, the target braking and driving force calculation unit 10 acquires the operating state of the braking device 33, and in a case where the braking device 33 is generating a braking force, the gain of the feedback control is changed based on the speed of the vehicle, as described above, and in a case where the braking device 33 is not generating a braking force, the gain of the feedback control may not be changed. In this way, while the vehicle is accelerating, it is possible to avoid a possibility that the acceleration may greatly deviate from the target acceleration due to the correction amount by the feedback becoming excessive.

Effects

In the braking and driving force control device 2 of the second embodiment, when the target braking and driving force is within the availability of the driving device 32, the braking and driving force control device 2 causes the driving device 32 to generate the target braking and driving force. When the target braking and driving force is less than the lower limit value of the availability of the driving device 32, the braking and driving force control device 2 causes the braking device 33, in addition to the driving device 32, to generate a braking force. The braking force that is generated by the braking device 33 is a braking force corresponding to the difference between the target braking force and the lower limit value (the retention value) of the availability at the point in time when the target braking and driving force becomes less than the lower limit value of the availability and braking is started. However, the target braking force is calculated by the feedback control of the acceleration of the vehicle. For this reason, the braking force that is generated by the braking device 33 indirectly reflects the variation in the lower limit value of the availability of the actual driving device 32, and thus the accuracy of control is improved, and the gain is suitably set. In this way, variation in a short time of the braking force that is generated by the braking device is avoided to suppress the bad influence on the behavior of the vehicle, and thus it is possible to avoid the deterioration of the feeling that the occupant receives.

In particular, in a case where the speed of the vehicle is a low speed less than a predetermined value, compared to a case where the speed of the vehicle is equal to or larger than the predetermined value, when the gain of the feedback control is increased, it is possible to more early perform a countermeasure for reducing the target braking force so as to cancel the influence of the increase in the lower limit value of the availability due to the creep torque at the time of a low speed. In this manner, by changing the gain under a predetermined condition, based on the variation characteristic of the lower limit value of the availability, the control of the braking force corresponding to the characteristic variation becomes possible. In a determination of whether or not to cause the braking device 33 to generate a braking force, as the lower limit value of the availability, rather than the retention value, a newly acquired value is used. For this reason, a determination itself that the braking device 33 has to be operated can be accurately made based on the current availability, and a start delay of the operation of the braking device 33 or an unnecessary continuation of the operation can be avoided.

The embodiments of the disclosure have been described above. However, the respective features of the first embodiment and the second embodiment may be appropriately combined and implemented to improve stability and accuracy of control. For example, in the first embodiment, feedback of the acceleration of the vehicle of the second embodiment may be performed in the calculation of the target braking and driving force, and the gain of the feedback may be changed according to the speed of the vehicle.

The disclosure can be grasped as a braking and driving force control device, a braking and driving force control method that is executed by a computer of the braking and driving force control device, a braking and driving force control program, a computer readable non-transitory recording medium storing the braking and driving force control program, a braking and driving force control system, a vehicle, or the like.

The disclosure is useful for a braking and driving force control device that is mounted on a vehicle or the like.

What is claimed is:

1. A braking and driving force control device mounted on a vehicle and configured to control a driving device configured to generate a braking and driving force and a braking device configured to generate a braking force, the braking and driving force control device comprising:
a processor programmed to:
calculate a target braking and driving force that is a target value of the braking and driving force, based on at least a requested value of acceleration;
cause the driving device to generate the braking and driving force and cause the braking device to generate the braking force, based on the target braking and driving force and availability that represents a range of the braking and driving force currently generable by the driving device;
in a case where the target braking and driving force is within the availability, cause the driving device to generate the target braking and driving force;
in a case where the target braking and driving force is less than a lower limit value of the availability:
i) cause the driving device to generate a braking and driving force corresponding to the lower limit value of the availability,
ii) perform arithmetic processing of suppressing time variation on the lower limit value of the availability, and
iii) cause the braking device to generate a braking force corresponding to a difference between the lower limit value of the availability after the arithmetic processing and the target braking and driving force.

2. The braking and driving force control device according to claim 1, wherein the arithmetic processing includes a low-pass filter arithmetic operation.

3. The braking and driving force control device according to claim 1, wherein the arithmetic processing includes change amount guard processing that causes a calculated value to follow the lower limit value of the availability while variation is suppressed such that a difference between the calculated value and a previous calculated value is within a predetermined allowable value.

4. The braking and driving force control device according to claim 1, wherein the processor is programmed to change a degree of suppressing the time variation according to a variation characteristic of the lower limit value of the availability with respect to a speed of the vehicle in the arithmetic processing.

5. The braking and driving force control device according to claim 4, wherein the processor is programmed to, in a case where the speed of the vehicle is less than a predetermined speed, reduce the degree of suppressing the time variation, compared to a case where the speed of the vehicle is equal to or higher than the predetermined speed, in the arithmetic processing.

* * * * *